(12) United States Patent
Dorland et al.

(10) Patent No.: US 11,793,211 B2
(45) Date of Patent: Oct. 24, 2023

(54) DAIRY PROCESSING SYSTEMS AND METHODS

(71) Applicant: Memtec LLC, Sun Valley, ID (US)

(72) Inventors: Sara A. Dorland, Hailey, ID (US); Bjorn Sorensen, Issaquah, WA (US)

(73) Assignee: Memtec LLC, Sun Valley, ID (US)

( * ) Notice: Subject to any disclaimer, the term of this patent is extended or adjusted under 35 U.S.C. 154(b) by 9 days.

(21) Appl. No.: 17/399,190

(22) Filed: Aug. 11, 2021

(65) Prior Publication Data

US 2022/0030898 A1 Feb. 3, 2022

Related U.S. Application Data

(62) Division of application No. 16/408,339, filed on May 9, 2019, now Pat. No. 11,109,604.

(51) Int. Cl.
 *A23C 9/142* (2006.01)
 *A23C 9/12* (2006.01)
 *A23C 9/146* (2006.01)

(52) U.S. Cl.
 CPC .......... *A23C 9/1422* (2013.01); *A23C 9/1206* (2013.01); *A23C 9/1427* (2013.01); *A23C 9/1465* (2013.01)

(58) Field of Classification Search
 CPC ... A23C 9/1422; A23C 9/1206; A23C 9/1427; A23C 9/1465
 (Continued)

(56) References Cited

U.S. PATENT DOCUMENTS 5,756,680 A  5/1998  Ahmed et al.
5,976,597 A  11/1999  Takada et al.
(Continued)

FOREIGN PATENT DOCUMENTS

CN  103709246  9/2015
CN  106008704  10/2016
(Continued)

OTHER PUBLICATIONS

Marella et al., Evaluation of commercially available, wide-pore ultrafiltration membranes for production of α-lactalbumin-enriched whey protein concentrate, Midwest Dairy Foods Research Center, Department of Dairy Science, and Department of Agricultural and Biosystems Engineering, SDSU, Brook. 57007. (Year: 2011).*

(Continued)

*Primary Examiner* — Brent T O'Hern
(74) *Attorney, Agent, or Firm* — Foley & Lardner LLP

(57) ABSTRACT

Systems and methods for filtering dairy may filter milk with a wide-pore filter to produce a wide-pore retentate and a wide-pore permeate, wherein the wide-pore retentate may comprise casein and beta-lactoglobulin. The systems and methods may further ultra-filter the wide-pore permeate to produce an ultra-filtered retentate and an ultra-filtered permeate, wherein the ultra-filtered retentate comprises alpha-lactalbumin. The systems and methods may further nano-filter the ultra-filtered permeate to produce a nano-filtered retentate and a nano-filtered permeate, wherein the nano-filtered retentate comprises lactose. The systems and methods may further perform reverse osmosis (RO) on the nano-filtered permeate to produce a reverse osmosis retentate and a reverse osmosis permeate.

19 Claims, 8 Drawing Sheets

(58) Field of Classification Search
USPC .......................................................... 426/42
See application file for complete search history.

(56) References Cited

U.S. PATENT DOCUMENTS

| | | | |
|---|---|---|---|
| 6,544,498 | B1 | 4/2003 | Takada et al. |
| 7,169,428 | B2 | 1/2007 | Dunker et al. |
| 7,829,130 | B2 | 11/2010 | Tossavainen et al. |
| 7,932,069 | B2 | 4/2011 | Ichihashi et al. |
| 7,943,069 | B2 | 4/2011 | Ichihashi et al. |
| 8,445,052 | B2 | 5/2013 | Holst et al. |
| 8,449,938 | B2 | 5/2013 | Tossavainen et al. |
| 8,580,323 | B2 | 11/2013 | Yan et al. |
| 8,986,768 | B2 | 3/2015 | Tikanmaki et al. |
| 9,510,606 | B2 | 12/2016 | Ur-Rehman et al. |
| 9,538,770 | B2 | 1/2017 | Ur-Rehman et al. |
| 9,993,009 | B2 | 6/2018 | Tobin et al. |
| 10,080,372 | B2 | 9/2018 | Kallioinen et al. |
| 2004/0040448 | A1* | 3/2004 | Dunker ............... A23C 9/1422 99/452 |
| 2007/0098871 | A1 | 5/2007 | Dunker et al. |
| 2007/0166447 | A1 | 7/2007 | Ur-Rehman et al. |
| 2010/0297294 | A1 | 11/2010 | Ur-Rehman et al. |
| 2010/0303958 | A1 | 12/2010 | Ur-Rehman et al. |
| 2011/0206806 | A1 | 8/2011 | Ur-Rehman et al. |
| 2013/0230623 | A1 | 9/2013 | Sibakov et al. |
| 2014/0113043 | A1 | 4/2014 | Ur-Rehman et al. |
| 2017/0079297 | A1 | 3/2017 | Ur-Rehman et al. |
| 2017/0079299 | A1 | 3/2017 | Ur-Rehman et al. |
| 2017/0079300 | A1 | 3/2017 | Dunker et al. |
| 2017/0094987 | A1 | 4/2017 | Ur-Rehman et al. |
| 2020/0352189 | A1 | 11/2020 | Dorland et al. |

FOREIGN PATENT DOCUMENTS

| | | |
|---|---|---|
| EP | 556083 | 8/1996 |
| EP | 1466923 | 10/2004 |
| EP | 1218410 | 6/2005 |
| EP | 1409538 | 1/2009 |
| EP | 1912513 | 9/2013 |
| EP | 2873329 | 5/2017 |
| EP | 3097787 | 11/2018 |
| WO | 199302098 | 2/1993 |
| WO | 2003094623 | 11/2003 |
| WO | 2004019693 | 3/2004 |
| WO | 2008077071 | 6/2008 |
| WO | 2009059265 | 5/2009 |
| WO | 2009059266 | 5/2009 |
| WO | 2009059267 | 5/2009 |
| WO | 2018144438 | 8/2018 |
| WO | 2018226689 | 12/2018 |

OTHER PUBLICATIONS

"Dairy Proteins: Nutrition, Product, and Market Benefits", Journal of Food Science, Mar. 2015 Supplement, vol. 80 Supp. 1.

"Microfiltered Milk Ingredients, Production, Markets, and Manufacturers", US Dairy Export Council 2016, May 2016.

"Nanofiltration, a Review: Nanofiltration and Other New Technology for the Dairy Industry", U.S. Dairy Export Council, Oct. 2007.

Argarwal, et al., "Innovative Uses of Milk Protein Concentrates in Product Development", Journal of Food Science, vol. 80, S1, 2015.

Arunkumar, et al., "Milk Protein Concentration Using Negatively Charged Ultrafiltration Membranes", Foods, Aug. 28, 2018, 7, 134, doi: 10.3390/foods7090134.

Barbano, et al., "Milk Protein Ingredients: Micellar Casein and Serum Protein Concentrations Produced with Microfiltration", Oct. 16, 2009.

Chen, et al., "Chapter 8—Membrane Separations in the Dairy Industry", Separation of Functional Molecules in Food by Membrane Technology, 2019, pp. 267-304.

De Carvalho, et al., "Chapter 3—Applications of Membrane Technologies in the Dairy Industry", Engineering Aspects of Milk and Dairy Products, 2009, pp. 33-56.

Devries, et al., "Supplemental Protein in Support of Muscle Mass and Health: Advantage Whey", Journal of Food Science, vol. 80, S1, 2015; doi:10.1111/1450-3841.12802.

Dorland, et al., Notice of Allowance dated Jul. 12, 2021 for U.S. Appl. No. 16/408,339.

Dorland, et al., Office Action dated Feb. 2, 2021 for U.S. Appl. No. 16/408,339.

Dorland, et al., Office Action dated May 10, 2021 for U.S. Appl. No. 16/408,339.

Lagrange, et al., "Global Market for Dairy Proteins", Journal of Food Science, vol. 80, S1, 2015; doi:10.1111/1750-3841.12801.

Litwin, et al., "Dairy Proteins in Nutrition and Food Science: Functional Ingredients in the Current Global Marketplace", Journal of Food Science, vol. 80, S1, 2015; doi:10.1111/1750-3841.12800.

Marella, et al., "Application of Membrane Separation Technology for Developing Novel Dairy Food Ingredients", Journal of Food Processing and Technology, 2013, vol. 4, Issue 9.

Marella, et al., "Evaluation of Commercially Available, Wide-Pore Ultrfiltration Membranes for Production of a-lactalbumin-enriched Whey Protein Concentrate", J. Dairy Sci. 94:1165-1175, doi: 10/3168/jds.2010-3739, 2011.

Marella, et al., "Manufacture of Modified Milk Protein Concentrate Utilizing Injection of Carbon Dioxide", Journal of Dairy Science, Jun. 2015, vol. 98, Issue 6, pp. 3577-3589.

Marella, "Whey Protein Fractionation Using Membrane Separation Technology", A dissertation submitted at South Dakota State University, 2009, UMI No. 3375121.

Metzger, et al., "Use of Filtration Technology for Production of a-lactalbumin and b-lactoglobulin", PowerPoint Slides, Midwest Dairy Foods Research Center and South Dakota State University, Jun. 10, 2011.

Pasiakos, "Metabolic Advantages of Higher Protein Diets and Benefits of Dairy Foods on Weight Management, Glycemic Regulation, and Bone", Journal of Food Science, vol. 80, S1, 2015; doi:10.1111/1750-3841.12804.

Zydney, "ProteinSeparationsUsingMembraneFiltration:New Opportunities for Whey Fractionation", International Dairy Journal, vol. 8, Issue 3, Mar. 1998, pp. 243-250.

* cited by examiner

DAIRY PROCESSING SYSTEMS AND METHODS

RELATED APPLICATIONS

This application is a division of U.S. patent application Ser. No. 16/408,339, filed May 9, 2019 and titled DAIRY PROCESSING SYSTEMS AND METHODS, which is hereby incorporated herein by reference in its entirety.

TECHNICAL FIELD

The present disclosure is directed to systems and methods for filtering dairy (e.g., milk) and producing filtered dairy products.

BACKGROUND

A large variety of food products are made from milk, such as cheese, butter, cream, and yogurt. Dairy represents a major dietary staple of the human population. Milk, cheese, yogurt, cream and other dairy products provide a number of nutritional ingredients, including various proteins, vitamins, and minerals. For example, milk is a good source of protein, calcium, vitamin B12, and riboflavin. A system that separates milk into several components may be desirable to enable production of various dairy product compositions.

BRIEF DESCRIPTION OF THE DRAWINGS

Additional aspects and advantages will be apparent from the following detailed description of preferred embodiments, which proceeds with reference to the accompanying drawings, in which.

DETAILED DESCRIPTION

The nutritional content of milk can be exploited to produce nutritionally enhanced dairy compositions. Systems and methods described herein use various filtering techniques to separate components of milk and combine one or more milk components to produce filtered dairy products with enhanced compositions.

As used herein, milk refers to the lacteal secretion, practically free from colostrum, obtained by the complete milking of one or more healthy cows. The term milk, as used herein, can broadly encompass milk and milk products, including milk as specified by 21 C.F.R. 131.110 (Revised as of Apr. 1, 2018). For example, milk includes whole milk, fat-free milk, low-fat milk, full-fat milk, reduced-fat milk, lactose-free milk, concentrated milk, condensed milk, dry milk, skim milk, or any component derived from whole milk. The term milk is also intended to encompass milks from both animal and plant sources (e.g., cow, sheep, goat, or soybean).

The terms milk products, milk compositions, dairy products, or dairy compositions, as used herein, refer to dairy products comprising one or more milk components. The milk components described herein can be used to produce unflavored milk, flavored milk, yogurt, ice cream, cheese, milk powder, or other desired dairy products.

Membrane filters allow the flow of fluids while preventing the passage of particles and microorganisms. The membranes may be made of porous plastic films that retain particulates larger than a defined pore size. In other words, substances that are too large to fit through the filter's pores are retained as retentate by the membrane and excluded from the filtered stream.

The elements of the embodiments as generally described and illustrated in the figures herein can be arranged and designed in a wide variety of different configurations. Thus, the following more detailed description of various embodiments, as represented in the figures, is not intended to limit the scope of the present disclosure but is merely representative of various embodiments. While various aspects of the embodiments are presented in drawings, the drawings are not necessarily drawn to scale unless specifically indicated.

The phrase "coupled to" is broad enough to refer to any suitable coupling or other form of interaction between two or more elements. Two elements may be coupled to each other even though they are not in direct contact with each other. For example, two elements may be coupled to one another through an intermediate element.

Figure 1:
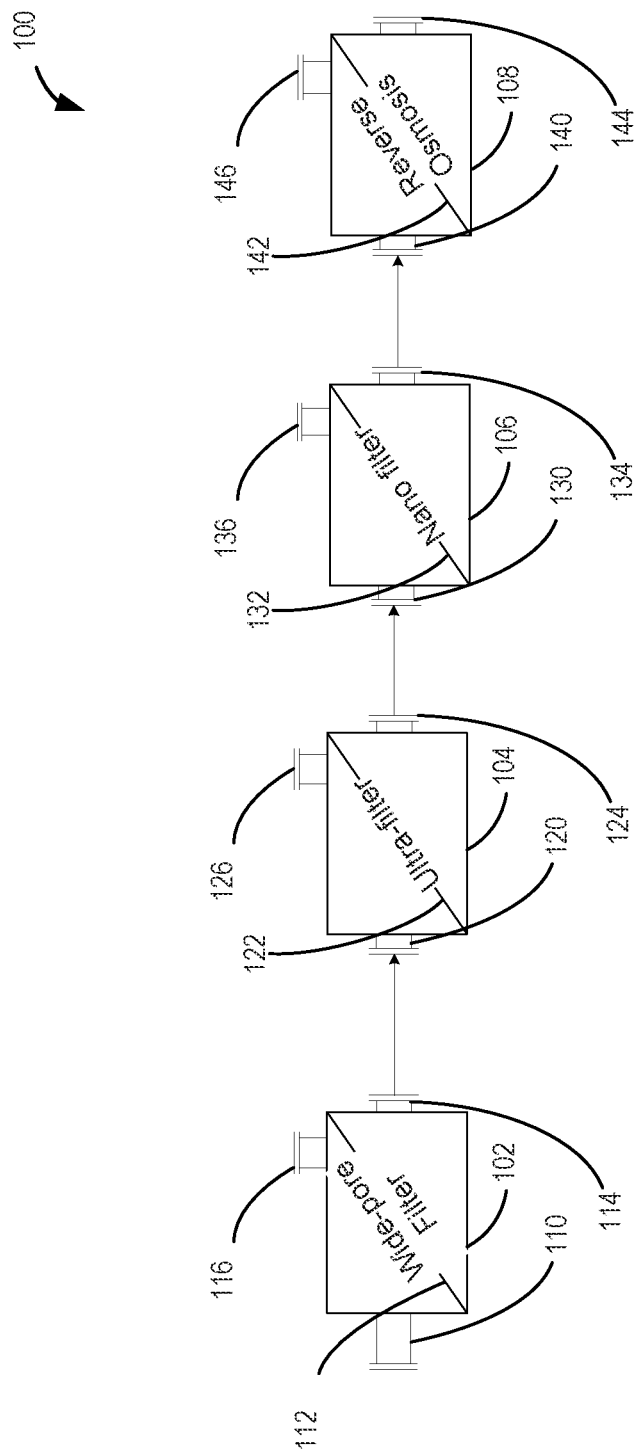
FIG. 1 is a block diagram of a filtering system for milk, according to one embodiment.

FIG. 1 is a block diagram of a filtering system 100 (e.g., an alpha-filtering system) for milk, according to one embodiment. The filtering system 100 may provide alpha-filtering, according to the present disclosure. Alpha-filtering can comprise wide-pore filtering and ultra-filtering, as described herein. Alpha-filtering can separate casein and beta-lactoglobulin from alpha-lactalbumin using wide-pore filtering and retain the alpha-lactalbumin using ultra-filtering. The milk products resulting from alpha-filtering may be used to produce an alpha-filtered product. An alpha-filtered milk product or dairy product may, in certain embodiments, include alpha-lactalbumin.

The filtering system 100 includes a wide-pore filtering unit 102, an ultra-filtering unit 104, a nano-filtering unit 106, and a reverse osmosis unit 108. In some embodiments, the milk is passed through the filtering system 100 in a unidirectional flow to produce an alpha-filtered milk product or other dairy product.

In the illustrated embodiment, the wide-pore filtering unit 102 includes an inlet 110, a wide-pore filter membrane 112 and two outlets (i.e., first outlet 114 and second outlet 116). The inlet 110 may receive milk. For example, the first inlet 110 may receive whole milk, skim milk, a milk component, or a milk product.

The wide-pore filtering unit 102 filters the received milk with the wide-pore filter membrane 112. In some embodiments, the wide-pore filter membrane 112 has a pore size that excludes or retains milk components that include casein and beta-lactoglobulin from the filtered stream (i.e., permeate). The smallest molecule retained by the wide-pore filter membrane 112 may have a molecular weight between 25 kDa and 350 kDa. Stated otherwise, in certain embodiments, the wide-pore filter membrane 112 may have pores of varying sizes and different pores may retain or exclude molecules of different molecular weights between 25 kDa and 350 kDa. In some embodiments, subjecting the milk to the wide-pore filter membrane 112 would exclude molecules with a molecular weight of 25 kDa or higher. In some embodiments, subjecting the milk to the wide-pore filter membrane 112 would exclude molecules with a molecular weight of 350 kDa or higher. In yet other embodiments, subjecting the milk to the wide-pore filter membrane 112 would exclude molecules with a molecular weight of 100 kDa or higher. In some embodiments, the diameter of the pores of the wide-pore filter membrane 112 may be between 4 nm and 10 nm.

Figure 2:
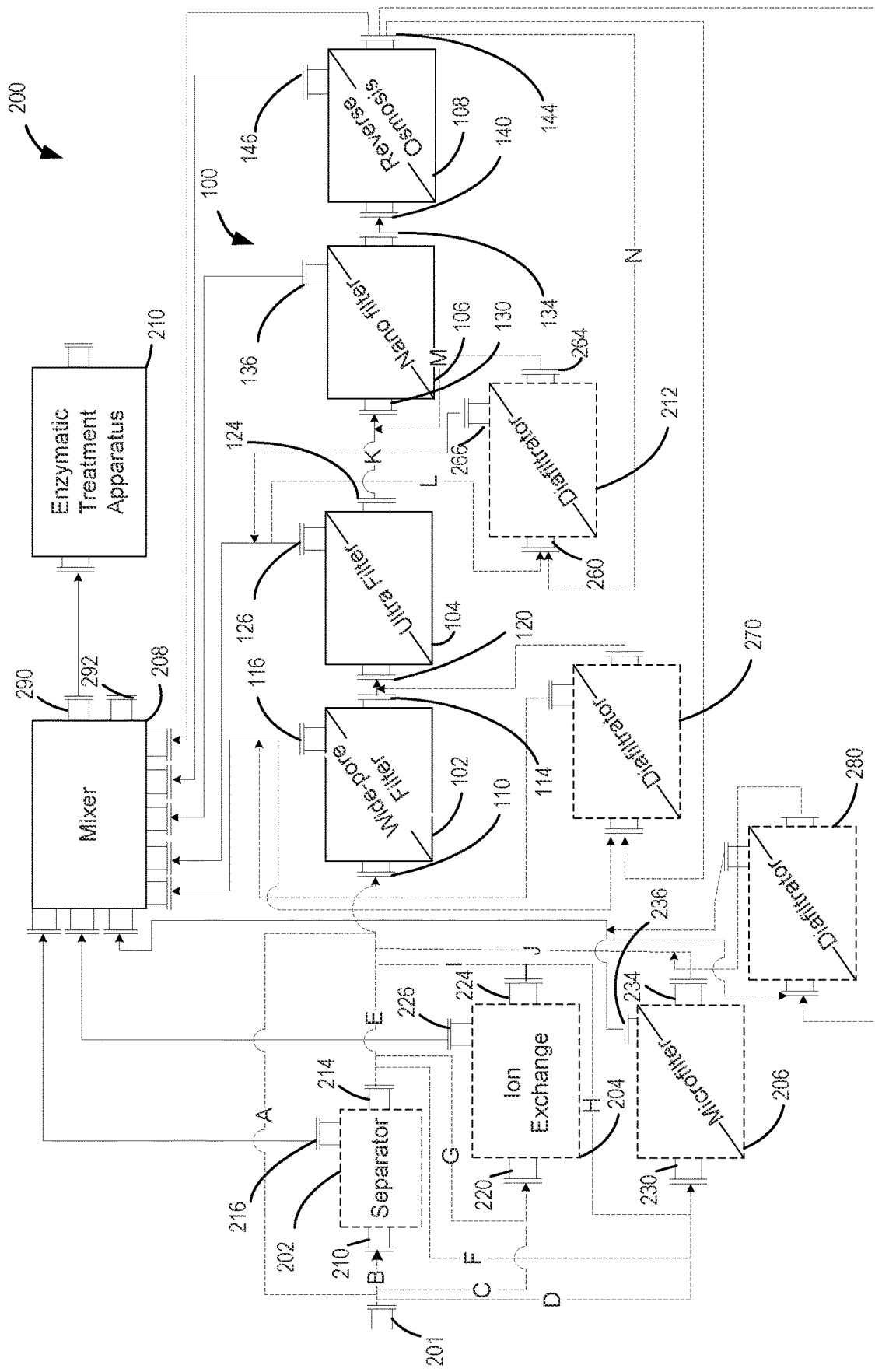
FIG. 2 is a block diagram of a dairy processing system using the filtering system of FIG. 1.

Subjecting the milk to the wide-pore filter membrane 112 produces a wide-pore retentate and a wide-pore permeate. The wide-pore retentate may include beta-lactoglobulin. In embodiments where the wide-pore filter membrane 112 filters whole milk or skim milk, the wide-pore retentate may also include casein. The wide-pore retentate exits through the second outlet 116 of the wide-pore filtering unit 102, and the wide-pore permeate exits through the first outlet 114 of the wide-pore filtering unit 102. The first outlet 114 may be coupled to an inlet 120 of the ultra-filtering unit 104. Thus, the wide-pore permeate may be fed from the wide-pore filtering unit 102 to the ultra-filtering unit 104. Diafiltration may be added to the wide-pore membrane 112 to help facilitate the filtering of the milk into the wide-pore retentate and wide-pore permeate as illustrated in FIG. 2.

In the illustrated embodiment, the ultra-filtering unit 104 includes an inlet 120, an ultra-filter membrane 122 and two outlets (i.e., first outlet 124 and second outlet 126). The inlet 120 may receive the wide-pore permeate from the wide-pore filtering unit 102 or diafiltered permeate from a diafilter.

The ultra-filtering unit 104 filters the wide-pore permeate with the ultra-filter membrane 122. In some embodiments, the ultra-filter membrane 122 has a pore size that excludes or retains milk components that include alpha-lactalbumin from the filtered stream. The wide-pore filtering unit 102 and the ultra-filtering unit 104 may comprise alpha-filtration. For example, the wide-pore filtering unit 102 removes a significant portion of the casein and beta-lactoglobulin from the milk, providing the ultra-filtering unit 104 with a wide-pore permeate primarily free of casein and beta-lactoglobulin and comprising alpha-lactalbumin as the largest particle. Thus, the retentate from the wide-pore filtering unit 102 may primarily constitute casein and beta-lactoglobulin, while the retentate from the ultra-filtering unit 104 may comprise mostly alpha-lactalbumin. The smallest molecule retained by the ultra-filter membrane 122 may have a molecular weight between 1 kDa and 25 kDa. For example, in some embodiments, subjecting the milk to the ultra-filter membrane 122 would exclude molecules with a molecular weight of 1 kDa or higher. In some embodiments, subjecting the milk to the ultra-filter membrane 122 would exclude molecules with a molecular weight of 25 kDa or higher. In yet other embodiments, subjecting the milk to the ultra-filter membrane 122 would exclude molecules with a molecular weight of 5 kDa or higher.

Subjecting the wide-pore permeate to the ultra-filter membrane 122 produces an ultra-filtered retentate and an ultra-filtered permeate. The ultra-filtered retentate may include alpha-lactalbumin. The ultra-filtered retentate exits through the second outlet 126 of the ultra-filtering unit 104, and the ultra-filtered permeate exits through the first outlet 124 of the ultra-filtering unit 104. The first outlet 124 may be coupled to an inlet 130 of the nano-filtering unit 106. Thus, the ultra-filtered permeate may fed from the ultra-filtering unit 104 to the nano-filtering unit 106. A diafiltrator (FIG. 2) may be added to the ultra-filter membrane 122 to help facilitate the filtering of the wide-pore permeate into the ultra-filtered retentate and ultra-filtered permeate.

In the illustrated embodiment, the nano-filtering unit 106 includes an inlet 130, a nano-filter membrane 132 and two outlets (i.e., first outlet 134 and second outlet 136). The inlet 130 may receive the ultra-filtered permeate from the ultra-filtering unit 104 or the diafiltered permeate from a diafiltrator.

The nano-filtering unit 106 filters the ultra-filtered permeate or the diafiltered permeate from the ultra-filter unit 104 with the nano-filter membrane 132. In some embodiments, the nano-filter membrane 132 has a pore size that excludes milk components that include lactose from the filtered stream. The smallest molecule retained by the nano-filter membrane 132 may have a molecular weight between 100 Da and 5 kDa. For example, in some embodiments, subjecting the milk to the nano-filter membrane 132 would exclude molecules with a molecular weight of 100 Da or higher. In some embodiments, subjecting the milk to the nano-filter membrane 132 would exclude molecules with a molecular weight of 5 kDa or higher. In yet other embodiments, subjecting the milk to the nano-filter membrane 132 would exclude molecules with a molecular weight of 2 kDa or higher.

Subjecting the ultra-filtered or diafiltered permeate to the nano-filter membrane 132 produces a nano-filtered retentate and a nano-filtered permeate. The nano-filtered retentate may include lactose. The nano-filtered retentate exits through the second outlet 136 of the nano-filtering unit 106, and the ultra-filtered permeate exits through the first outlet 134 of the nano-filtering unit 106. The first outlet 134 may be coupled to an inlet 140 of the reverse osmosis unit 108. Thus, the nano-filtered permeate may be fed from the nano-filtering unit 106 to the reverse osmosis unit 108.

In the illustrated embodiment, the reverse osmosis unit 108 includes an inlet 140, a reverse osmosis membrane 142 and two outlets (i.e., first outlet 144 and second outlet 146). The inlet 140 may receive the nano-filtered permeate from the nano-filtering unit 104.

The reverse osmosis unit 108 filters the nano-filtered permeate with the reverse osmosis membrane 142. In some embodiments, the reverse osmosis membrane 142 has a pore size that excludes milk components that include lactose and minerals from the filtered stream.

Subjecting the nano-filtered permeate to the reverse osmosis membrane 142 produces a reverse osmosis-filtered retentate and a reverse osmosis-filtered permeate. The reverse osmosis-filtered retentate may include minerals. The reverse osmosis-filtered retentate exits through the second outlet 146 of the reverse osmosis unit 108, and the reverse osmosis-filtered permeate exits through the first outlet 144 of the reverse osmosis unit 108.

The components of the filtering system 100 (i.e., the wide-pore filtering unit 102, the ultra-filtering unit 104, the nano-filtering unit 106, and the reverse osmosis unit 108) may be used with additional components (e.g., FIG. 2).

FIG. 2 is a block diagram of a dairy processing system 200 using the filtering system 100 (e.g., an alpha-filtering system) of FIG. 1. The dairy processing system 200 includes the components of the filtering system 100, and optionally includes one or more of a separator 202, a chromatography device 204, a micro-filter unit 206, a mixer 208, an enzymatic treatment apparatus 210, a first diafiltrator 212, a second diafiltrator 270, and a third diafiltrator 280 in addition to the components of the filtering system 100.

The filtering system 100 includes, as described with reference to FIG. 1, the wide-pore filtering unit 102, the ultra-filtering unit 104, the nano-filtering unit 106, and the reverse osmosis unit 108. The filtering system 100 may provide alpha-filtering, according to the present disclosure. Alpha-filtering can comprise wide-pore filtering and ultra-filtering, as described herein. Alpha-filtering can separate casein and beta-lactoglobulin from alpha-lactalbumin using the wide-pore filtering unit 102. In some embodiments, the micro-filter unit 206 separates casein from the beta-lactoglobulin and alpha-lactalbumin prior to alpha-filtering. The ultra-filtering unit 104 may then be used to retain the alpha-lactalbumin. The milk products resulting from alpha-filtering may be used to produce an alpha-filtered product. The alpha-filtered product may, in certain embodiments, include one or more molecule types retained (in the retentate) from filtering, including casein, beta-lactoglobulin and alpha-lactalbumin.

Arrows are used to indicate couplings between components. Additionally, dashed lines are used to illustrate potential couplings between components. A single arrow head at the inlet 110 of the wide-pore filtering unit 102 and the inlet 130 of the nano-filtering unit 106 indicates use of one of the potential couplings. The multiple arrow heads at the inlet 260 of the first diafiltrator 212 indicate that one or both of the potential couplings may be used.

An input inlet 201 may provide the dairy processing system 200 with whole milk, skim milk, a milk component, or a milk product. The input inlet 201 may be coupled to one of a number of different components. In some embodiments, the separator, the chromatography device 204, and the micro-filter unit 206 are not included in the dairy processing system 200. In these embodiments, the input inlet 201 may be coupled to the inlet 110 of the wide-pore filtering unit 102 and feed the whole milk, skim milk, a milk component, or a milk product to the wide-pore filtering unit 102 via coupling A. In some embodiments, the input inlet 201 may be coupled to the separator 202 via coupling B. In other embodiments, the input inlet 201 may be coupled to the chromatography device 204 via coupling C. In yet other embodiments, the input inlet 201 may be coupled to the micro-filter unit 206 via coupling D. While FIG. 2 illustrates all potential couplings with input inlet 201, in some embodiments, the input inlet 201 couples to a single component (e.g., separator 202, wide-pore filtering unit 102, chromatography device 204, or micro-filter unit 206).

In some embodiments, the separator 202 is optionally included. The separator 202 may include an inlet 210, a first outlet 214, and a second outlet 216. The input inlet 201 may be coupled to the inlet 210 of the separator 202 via coupling B. The input inlet 201 may feed whole milk to the separator 202 via coupling B. The separator 202 may separate whole milk into cream and skim milk. The cream may exit through the second outlet 216 of the separator 202 to the mixer 208. The skim milk may exit out of the first outlet 214. The first outlet 214 may be optionally coupled to one of an inlet 110 of the wide-pore filtering unit 102 via coupling E, an inlet 220 of the chromatography device 204 via coupling G, or an inlet 230 of the micro-filter unit 206 via coupling F. Thus, the skim milk may feed to the wide-pore filtering unit 102, the chromatography device 204, or the micro-filter unit 206. While FIG. 2 illustrates all potential couplings with the outlet 214 of the separator 202, in some embodiments, the outlet 214 is coupled to a single component (e.g., wide-pore filtering unit 102, chromatography device 204, or micro-filter unit 206).

In some embodiments, holding tanks may be used. Holding tanks may store unused components. For example, a mixed dairy product may exit the mixer 208 through a first outlet 290, and a byproduct may exit a second outlet 292. The mixer 208 may combine the separated components into dairy products with target component amounts. The remaining components may be sent to a holding tank as byproduct. In some embodiments, the byproduct could be more than one product (e.g., lactose and alpha-lactalbumin).

In some embodiments, the chromatography device 204 is optionally included. The chromatography device 204 may include an inlet 220, a first outlet 224, and a second outlet 226. In some embodiments, the input inlet 201 may be coupled to the inlet 220 of the chromatography device 204 via coupling C. In other embodiments, the inlet 220 of the chromatography device 204 may be coupled to the outlet 214 of the separator 202 via coupling G.

The chromatography device 204 may separate whole milk or skim milk to produce an eluate and a modified skim milk. The eluate may include lactoferrin and lactoperoxidase. The eluate may exit through the second outlet 226 of the chromatography device 204 to the mixer 208. The modified skim milk may exit out of the first outlet 224. The first outlet 224 may be optionally coupled to one of an inlet 110 of the wide-pore filtering unit 102 via coupling I, or an inlet 230 of the micro-filter unit 206 via coupling H. Thus, the modified skim milk may be fed to one of the wide-pore filtering unit 102 or the micro-filter unit 206. While FIG. 2 illustrates all potential couplings with first outlet 224 of the chromatography device 204, in some embodiments, the input inlet 201 couples to a single component (e.g., wide-pore filtering unit 102 or micro-filter unit 206).

In some embodiments, the micro-filter unit 206 is optionally included. The micro-filter unit 206 may include an inlet 230, a first outlet 234, and a second outlet 236. In some embodiments, the input inlet 201 may be coupled to the inlet 230 of the micro-filter unit 206 via coupling D. In other embodiments, the inlet 230 of the micro-filter unit 206 may be coupled to the outlet 224 of the chromatography device 204 via coupling H. In some embodiments the third diafiltrator 280 may be coupled to the micro-filter retentate outlet 236.

The micro-filter unit 206 may separate whole milk, skim milk, or modified skim milk (depending on source) to produce a micro-filtered retentate and a micro-filtered permeate. The micro-filtered retentate may include casein. The micro-filtered retentate may exit through the second outlet 236 of the micro-filter unit 206 to the mixer 208. The micro-filtered permeate may exit out of the first outlet 234 to the wide-pore filtering unit 102 via coupling J.

The wide-pore filtering unit 102 may filter whole milk, skim milk, or modified skim milk, or micro-filtered permeate (depending on source) to produce a wide-pore retentate and a wide-pore permeate. If the micro-filter unit 206 is used, the micro-filter unit 206 separates casein from beta-lactoglobulin. Thus, the wide-pore retentate may include beta-lactoglobulin if the micro-filter unit 206 is used, and the retentate may include casein and beta-lactoglobulin if the micro-filter unit 206 is not used. The wide-pore retentate may exit through the second outlet 116 of the wide-pore filtering unit 102 to the mixer 208. The wide-pore permeate may exit out of the first outlet 114 to the inlet 120 of the ultra-filtering unit 104. In some embodiments the second diafiltrator 270 may be coupled to the second outlet 116 of the wide-pore filtering unit 102.

The ultra-filtering unit 104 may filter the wide-pore permeate to produce ultra-filtered retentate and an ultra-filtered permeate. The ultra-filtered retentate may include casein and beta-lactoglobulin. The ultra-filtered retentate may fed through the second outlet 126 of the ultra-filtering unit 104 to the mixer 208. The ultra-filtered permeate may exit out of the first outlet 124 to the inlet 130 of the nano-filtering unit 106 via coupling K, or to the inlet 260 of the first diafiltrator 212 via coupling L.

The wide-pore filtering unit 102 and the ultra-filtering unit 104 may comprise alpha-filtration. For example, the wide-pore filtering unit 102 removes a significant portion of casein and beta-lactoglobulin from the stream, providing the ultra-filtering unit 104 with a stream primarily free of casein and beta-lactoglobulin and comprising alpha-lactalbumin as the largest particle. Accordingly, the retentate of the wide-pore filtering unit 102 may comprise primarily casein and beta-lactoglobulin, while the retentate of the ultra-filtering unit 104 may comprise primarily alpha-lactalbumin.

In some embodiments, one or more diafiltrators may be used.

For example, the first diafiltrator 212 is optionally included. The first diafiltrator 212 may include an inlet 260, a first outlet 264, and a second outlet 266. In some embodiments, the inlet 260 of the first diafiltrator 212 may connect to the ultra-filtering unit 104 via coupling L, and/or the reverse osmosis unit 108 via coupling N.

The first diafiltrator 212 may filter the ultra-filtered retentate and/or reverse osmosis (RO) permeate to produce a diafiltered retentate and a diafiltered permeate. The diafiltered retentate will exit through the second outlet 266 of the first diafiltrator 212 to the mixer 208 with the ultra-filtered retentate. In some embodiments, the diafiltered permeate may exit to the nano filtering unit 106 via coupling M Similarly, the second diafiltrator 270 may filter the wide-pore filtered retentate and/or reverse osmosis permeate to produce a diafiltered retentate and a diafiltered permeate. The diafiltered retentate will exit to the mixer 208 with the wide-pore filtered retentate. In some embodiments, the diafiltered permeate may exit to the ultra-filtering unit 104.

Similarly, the third diafiltrator 280 may filter the micro filtered retentate and/or reverse osmosis permeate to produce a diafiltered retentate and a diafiltered permeate. The diafiltered retentate will exit to the mixer 208 with the micro filtered retentate. In some embodiments, the diafiltered permeate may exit to the wide-pore filtering unit 102.

The nano-filtering unit 106 may filter the ultra-filtered permeate, or the diafiltered permeate (depending on source) to produce a nano-filtered retentate or a nano-filtered permeate. The nano-filtered permeate may include minerals. The nano-filtered retentate, containing lactose, may feed through the second outlet 136 of the nano-filtering unit 106 to the mixer 208. The nano-filtered permeate may exit out of the first outlet 134 to the inlet 140 of the reverse osmosis unit 108.

The reverse osmosis unit 108 may filter the nano-filtered permeate, to produce a reverse osmosis retentate and a reverse osmosis permeate. The reverse osmosis retentate may include minerals. The reverse osmosis retentate may exit through the second outlet 146 of the reverse osmosis unit 108 to the mixer 208. The reverse osmosis permeate may exit out of the first outlet 144 to the inlet 260 of the first diafiltrator 212, the second diafiltrator 270, and the third diafiltrator 280. Additionally, the reverse osmosis permeate may exit to the mixer.

The mixer 208 may mix at least a portion of two or more of the cream, the ion exchange retentate, the micro-filtered retentate, the wide-pore retentate, the ultra-filtered retentate, the nano-filtered retentate, the reverse osmosis retentate, the reverse osmosis permeate, the diafiltered microfiltered retentate, the diafiltered wide-pore retentate, and the diafiltered ultra-filtered retentate to form a mixture. In some embodiments, the mixture may be a milk product with a target level of milk components. For example, the nano-filtered retentate may be omitted from the mixture to produce a low lactose product. The mixture may be fed to enzymatic treatment apparatus 210, where the mixture is treated with a lactase enzyme.

Figure 3:
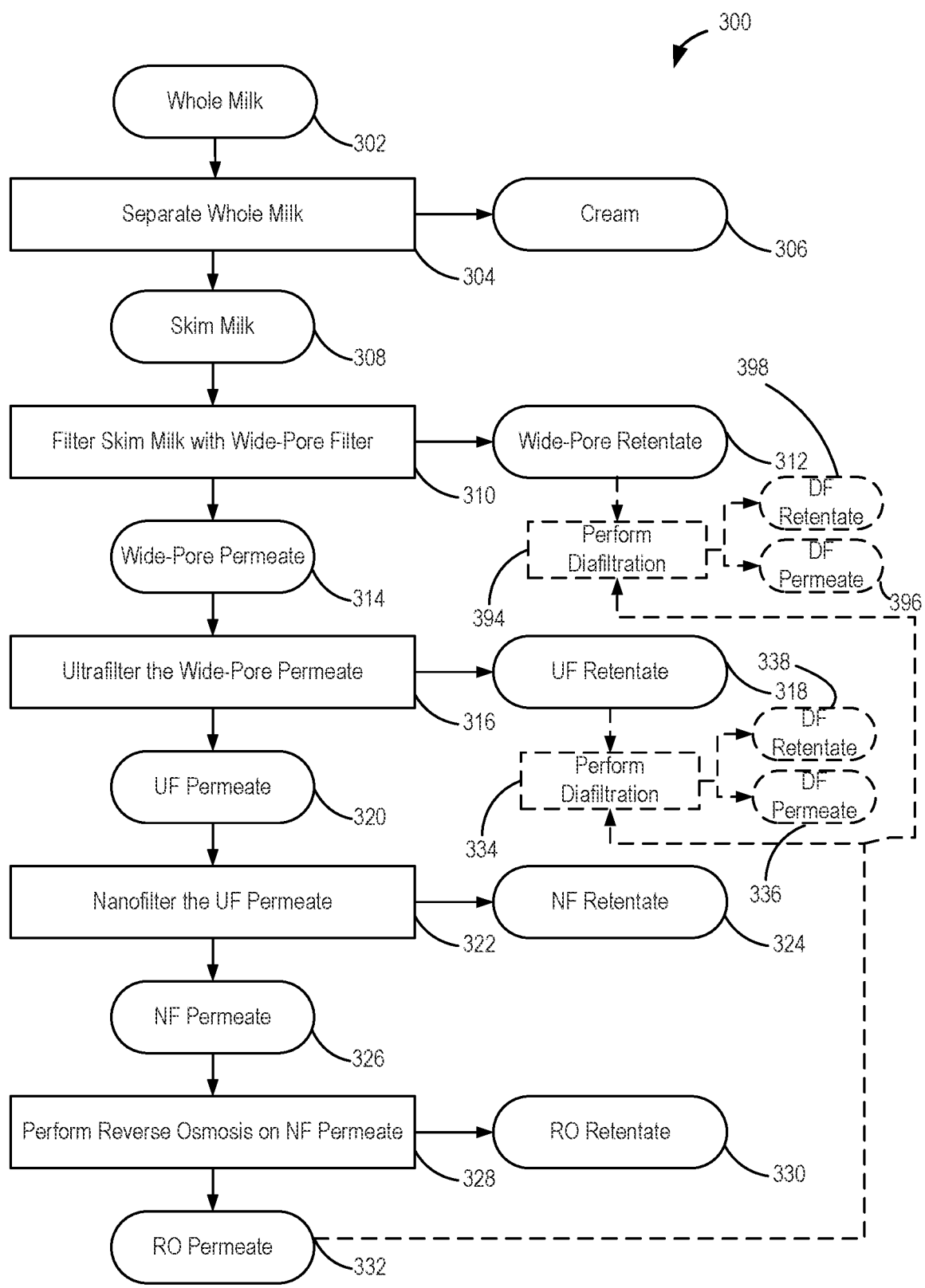
FIG. 3 illustrates a flow chart of a method for processing whole milk, according to a first embodiment.

FIG. 3 illustrates a flow chart of a method 300 for processing whole milk 302, according to a first embodiment. The method 300 may involve alpha-filtering, such as described above in FIG. 1. The method 300 includes separating 304 whole milk into cream 306 and skim milk 308. The method 300 may provide alpha-filtering, according to the present disclosure. Alpha-filtering can comprise wide-pore filtering and ultra-filtering, as described herein to separate casein and beta-lactoglobulin from alpha-lactalbumin using the wide-pore filtering and retaining the alpha-lactalbumin using ultra-filtering. The milk products resulting from alpha-filtering may be used to produce an alpha-filtered product.

The method 300 further includes filtering 310 the skim milk 308 with a wide-pore filter to produce a wide-pore retentate 312 and a wide-pore permeate 314. The wide-pore retentate comprises casein and beta-lactoglobulin. The method 300 further comprises ultra-filtering 316 the wide-pore permeate 314 to produce an ultra-filtered retentate 318 and an ultra-filtered permeate 320. The ultra-filtered retentate comprises alpha-lactalbumin.

The wide-pore filter and the ultra-filter may be used for alpha-filtration. For example, the wide-pore filter can remove a significant portion of casein and beta-lactoglobulin from the milk, providing the ultra-filter with a wide-pore permeate primarily free of casein and beta-lactoglobulin and comprising alpha-lactalbumin as the largest particle. Accordingly, the wide-pore retentate 312 may comprise primarily casein and beta-lactoglobulin, while the ultra-filtered retentate 318 may comprise primarily alpha-lactalbumin.

The method 300 further includes nano-filtering 322 the ultra-filtered permeate to produce a nano-filtered retentate 324 and a nano-filtered permeate 326. The nano-filtered retentate comprises lactose. The method 300 further comprises performing reverse osmosis on the nano-filtered permeate 326 to produce a reverse osmosis retentate and a reverse osmosis permeate. Optionally, in some embodiments, the method 300 may further comprise performing 334 diafiltration on the ultra-filtered retentate 318 or the reverse osmosis permeate 332 to produce a diafiltered permeate 336 and a diafiltered retentate 338. Optionally, in some embodiments, the method 300 may further comprise performing 394 diafiltration on the wide-pore retentate 312 to produce a diafiltered permeate 396 and a diafiltered retentate 398.

In certain embodiments, the method 300 may process milk other than whole milk. Such embodiments may omit the separation of cream and skim milk (e.g., separating 304 whole milk).

Figure 4:
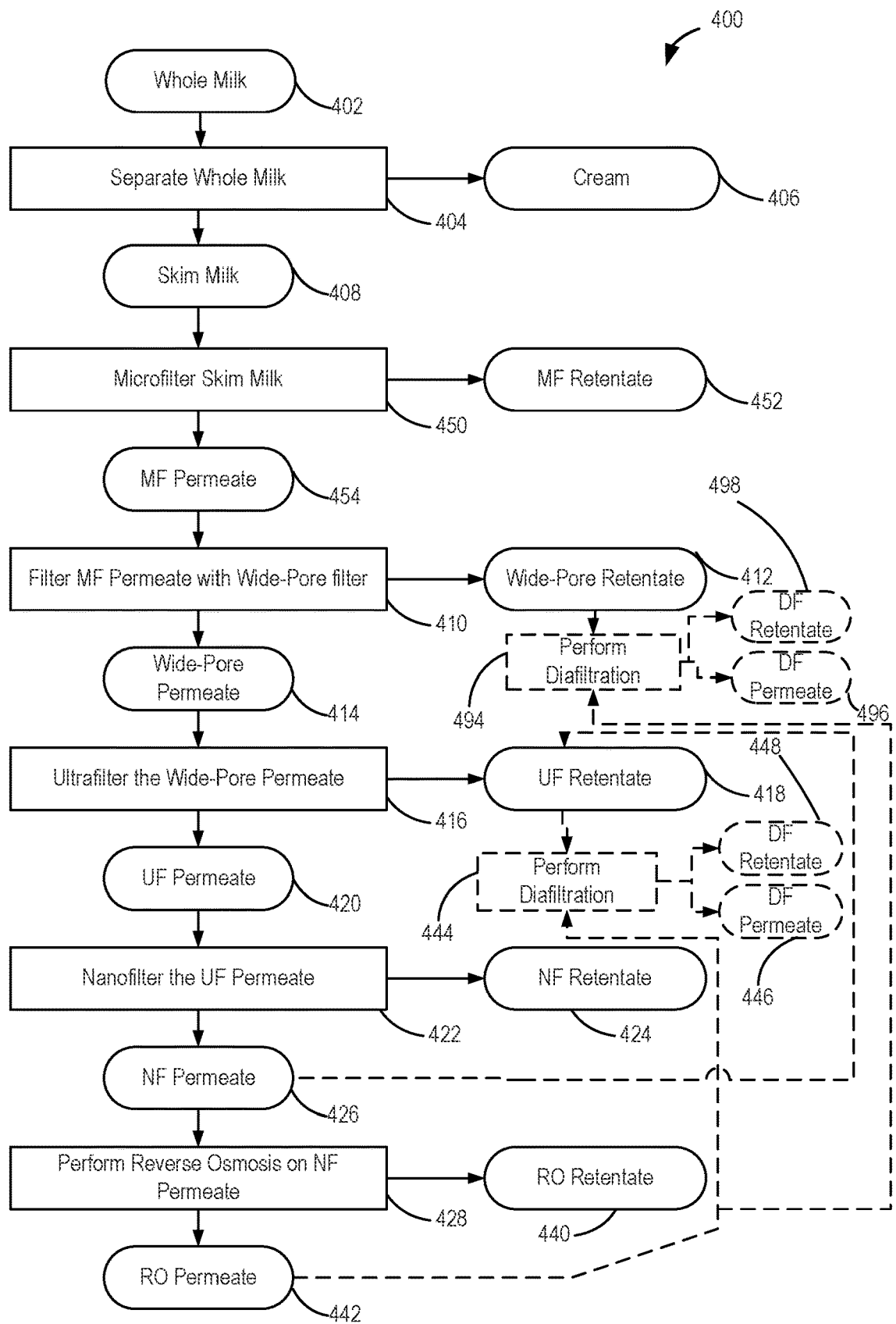
FIG. 4 illustrates a flow chart of a method for processing whole milk, according to a second embodiment.

FIG. 4 illustrates a flow chart of a method 400 for processing whole milk 402, according to a second embodiment. The method 400 may provide alpha-filtering, according to the present disclosure, to separate casein and beta-lactoglobulin from alpha-lactalbumin using the wide-pore filtering and retain the alpha-lactalbumin using ultra-filtering. The milk products resulting from alpha-filtering may be used to produce an alpha-filtered product.

The method 400 includes separating 404 whole milk into cream 406 and skim milk 408. In certain embodiments, method 400 may process milk other than whole milk. Such embodiments may omit the separation of cream and skim (e.g. separating 404 whole milk).

The method further includes micro-filtering 450 the skim milk to produce a micro-filtered retentate 452 and a micro-filtered permeate 454. The micro-filtered retentate comprises casein.

The method 400 further includes filtering 410 the micro-filtered permeate 454 with a wide-pore filter to produce a wide-pore retentate 412 and a wide-pore permeate 414. The wide-pore retentate comprises beta-lactoglobulin. The method 400 further comprises ultra-filtering 416 the wide-pore permeate 414 to produce an ultra-filtered retentate 418 and an ultra-filtered permeate 420. The ultra-filtered retentate comprises alpha-lactalbumin.

The wide-pore filter and the ultra-filter may be used for alpha-filtration. For example, after micro-filtration, the wide-pore filter removes a significant portion of beta-lactoglobulin from the stream, providing the ultra-filter 416 with a stream primarily free of beta-lactoglobulin and comprising mostly alpha-lactalbumin as the largest particle. Accordingly, the wide-pore retentate 412 may comprise primarily beta-lactoglobulin, while the ultra-filtered retentate 418 may comprise primarily alpha-lactalbumin.

The method 400 further comprises nano-filtering 422 the ultra-filtered permeate to produce a nano-filtered retentate 424 and a nano-filtered permeate 426. The nano-filtered retentate comprises mainly lactose. The method 400 further comprises reverse osmosis on the nano-filtered permeate 426 to produce a reverse osmosis retentate 440 and a reverse osmosis permeate 442. Optionally, in some embodiments, the method 400 may further comprise performing 444 diafiltration on the ultra-filtered retentate 418 or the reverse osmosis permeate 442 to produce a diafiltered permeate 446 and a diafiltered retentate 448. Optionally, in some embodiments, the method 400 may further comprise performing 494 diafiltration on the wide-pore retentate 412 to produce a diafiltered permeate 496 and a diafiltered retentate 498.

Figure 5:
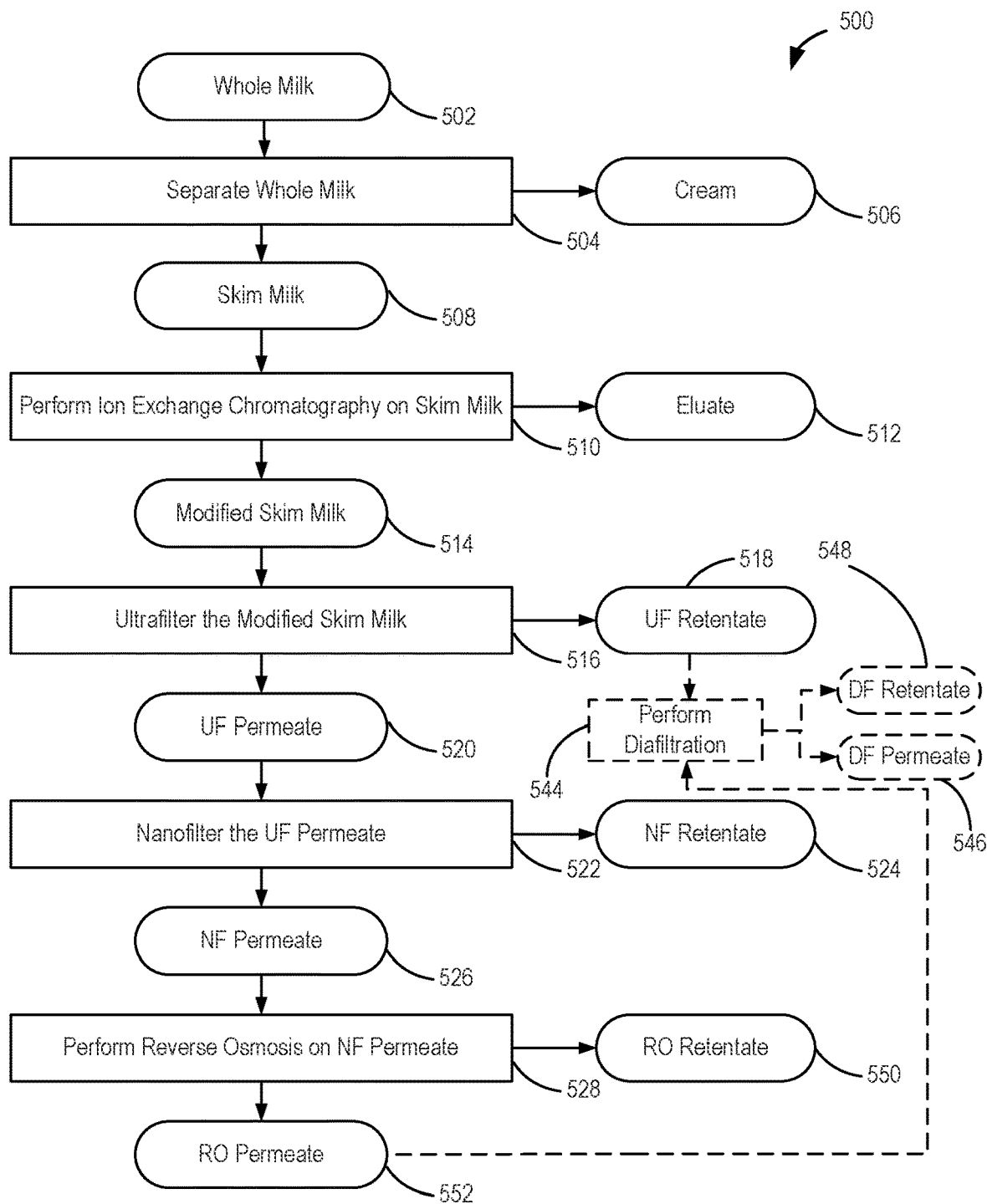
FIG. 5 illustrates a flow chart of a method for processing whole milk, according to a third embodiment.

FIG. 5 illustrates a flow chart of a method 500 for processing whole milk 502, according to a third embodiment. The method 500 includes separating 504 whole milk into cream 506 and skim milk 508. In certain embodiments, the method 500 may process milk other than whole milk. Such embodiments may omit the separation of cream and skim milk (e.g. separating 504 whole milk).

The method 500 further includes performing 510 ion exchange chromatography on the skim milk 508 to produce eluate 512 and a modified skim milk 514. The eluate comprises lactoferrin and lactoperoxidase. The method 500 further includes ultra-filtering 516 the modified skim milk 514 to produce an ultra-filtered retentate 518 and an ultra-filtered permeate 520. The ultra-filtered retentate comprises mainly alpha-lactalbumin. The method 500 further comprises nano-filtering 522 the ultra-filtered permeate 520 to produce a nano-filtered retentate 524 and a nano-filtered permeate 526. The nano-filtered retentate comprises contains mostly lactose. The method 500 further comprises performing reverse osmosis 528 on the nano-filtered permeate 526 to produce a reverse osmosis retentate 550 and a reverse osmosis permeate 552. Optionally, in some embodiments, the method 500 may further comprise performing diafiltration 544 on the ultra-filtered retentate 518 or the reverse osmosis permeate 552 to produce a diafiltered permeate 546 and a diafiltered retentate 548.

Figure 6:
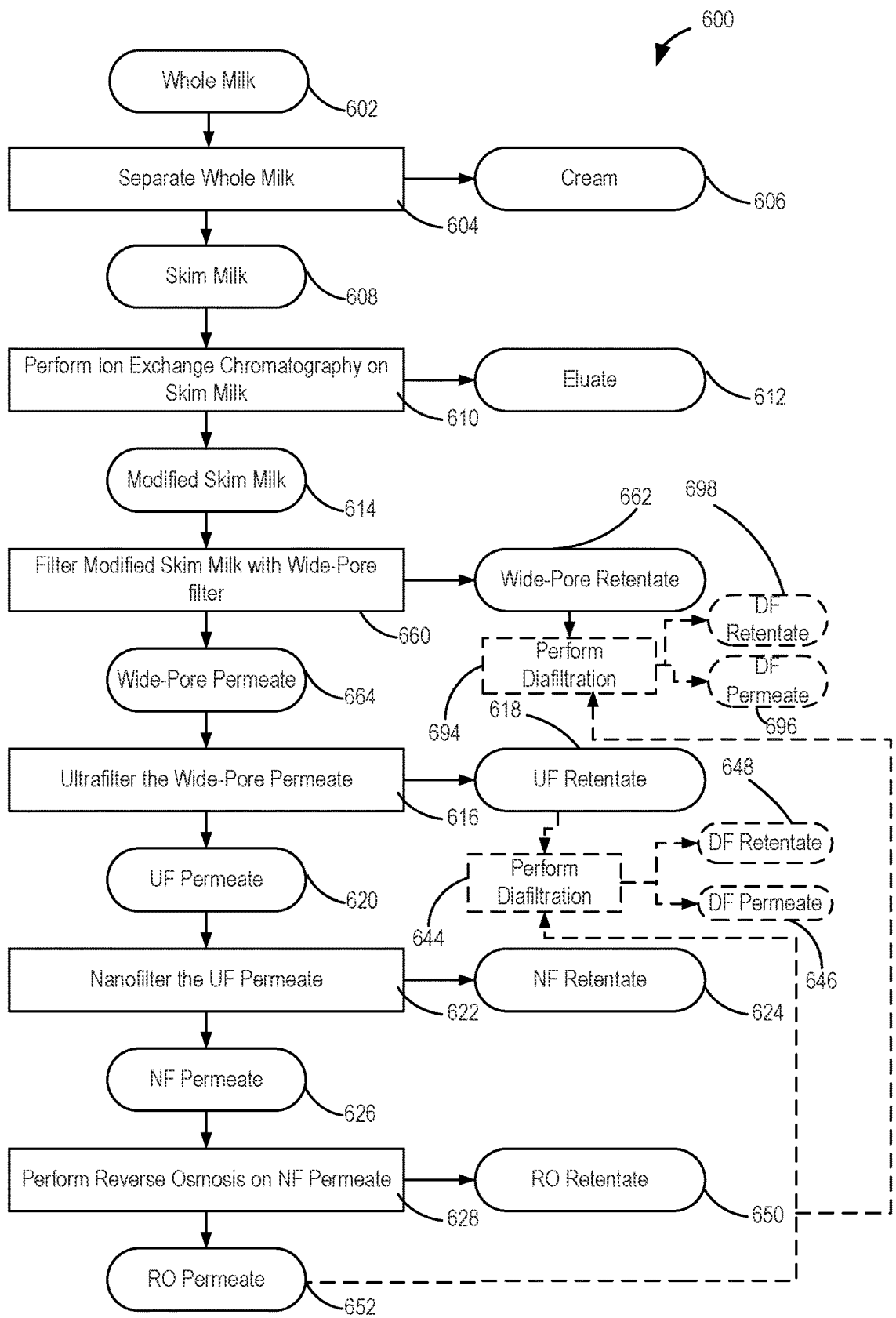
FIG. 6 illustrates a flow chart of a method for processing whole milk, according to a fourth embodiment.

FIG. 6 illustrates a flow chart of a method 600 for processing whole milk 602, according to a fourth embodiment. The method 600 may provide alpha-filtering, according to the present disclosure, to separate beta-lactoglobulin from alpha-lactalbumin using the wide-pore filtering and retain the alpha-lactalbumin using ultra-filtering. The milk products resulting from alpha-filtering may be used to produce an alpha-filtered product.

The method 600 includes separating 604 whole milk into cream 606 and skim milk 608. In certain embodiments, the method 600 may process milk other than whole milk. Such embodiments may omit the separation of cream and skim milk (e.g. separating 604 whole milk).

The method 600 further includes performing 610 ion exchange chromatography on the skim milk 608 to produce eluate 612 and a modified skim milk 614. The eluate comprises lactoferrin and lactoperoxidase.

The method 600 further includes filtering 660 the modified skim milk 614 with a wide-pore filter to produce a wide-pore retentate 662 and a wide-pore permeate 664. The method further includes ultra-filtering 616 the wide-pore permeate 664 to produce an ultra-filtered retentate 618 and an ultra-filtered permeate 620. The method 600 further comprises nano-filtering 622 the ultra-filtered permeate 620 to produce a nano-filtered retentate 624 and a nano-filtered permeate 626. The method 600 further comprises performing 628 reverse osmosis on the nano-filtered permeate 626 to produce a reverse osmosis retentate 620 and a reverse osmosis permeate 652. Optionally, in some embodiments, the method 600 may further comprise performing 644 diafiltration on the ultra-filtered retentate 618 and/or the reverse osmosis permeate 662 to produce a diafiltered permeate 646 and a diafiltered retentate 648. Optionally, in some embodiments, the method 600 may further comprise performing 694 diafiltration on the wide-pore retentate 662 to produce a diafiltered permeate 696 and a diafiltered retentate 698.

Figure 7:
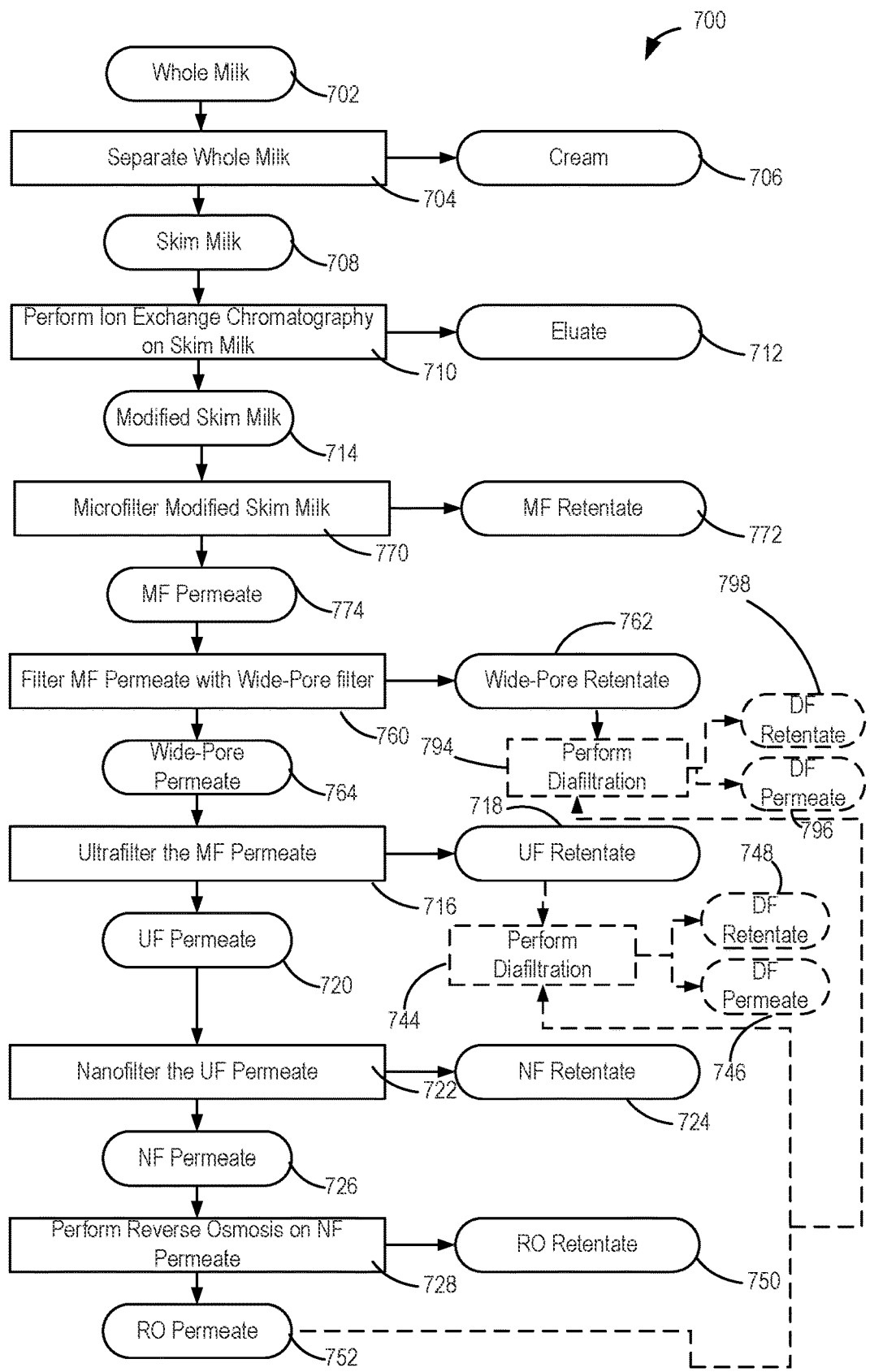
FIG. 7 illustrates a flow chart of a method for processing whole milk, according to a fifth embodiment.

FIG. 7 illustrates a flow chart of a method 700 for processing whole milk 702, according to a fifth embodiment. The method 700 includes separating 704 whole milk into cream 706 and skim milk 708. In certain embodiments, the method 700 may process milk other than whole milk. Such embodiments may omit the separation of cream and skim milk (e.g. separating 304 whole milk). The method 700 further includes performing 710 ion exchange chromatography on the skim milk 708 to produce eluate 712 and a modified skim milk 714. The eluate comprises lactoferrin and lactoperoxidase.

The method 700 further includes micro-filtering the modified skim milk 714 to produce a micro-filtered retentate 772 and a micro-filtered permeate 774. The method 700 further includes filtering 760 the micro-filtered permeate 774 with a wide-pore filter to produce a wide-pore retentate 762 and a wide-pore permeate 764. The method further includes ultra-filtering 716 the wide-pore permeate 764 to produce an ultra-filtered retentate 718 and an ultra-filtered permeate 720. The method 700 further comprises nano-filtering 722 the ultra-filtered permeate 720 to produce a nano-filtered retentate 724 and a nano-filtered permeate 726. The method 700 further comprises performing reverse osmosis 728 on the nano-filtered permeate 726 to produce a reverse osmosis retentate 750 and a reverse osmosis permeate 752. Optionally, in some embodiments, the method 700 may further include performing 744 diafiltration 744 on the ultra-filtered retentate 718 or the reverse osmosis permeate 752 to produce a diafiltered permeate 746 and a diafiltered retentate 748. Optionally, in some embodiments, the method 700 may further comprise performing 794 diafiltration on the wide-pore retentate 762 to produce a diafiltered permeate 796 and a diafiltered retentate 798.

Figure 8:
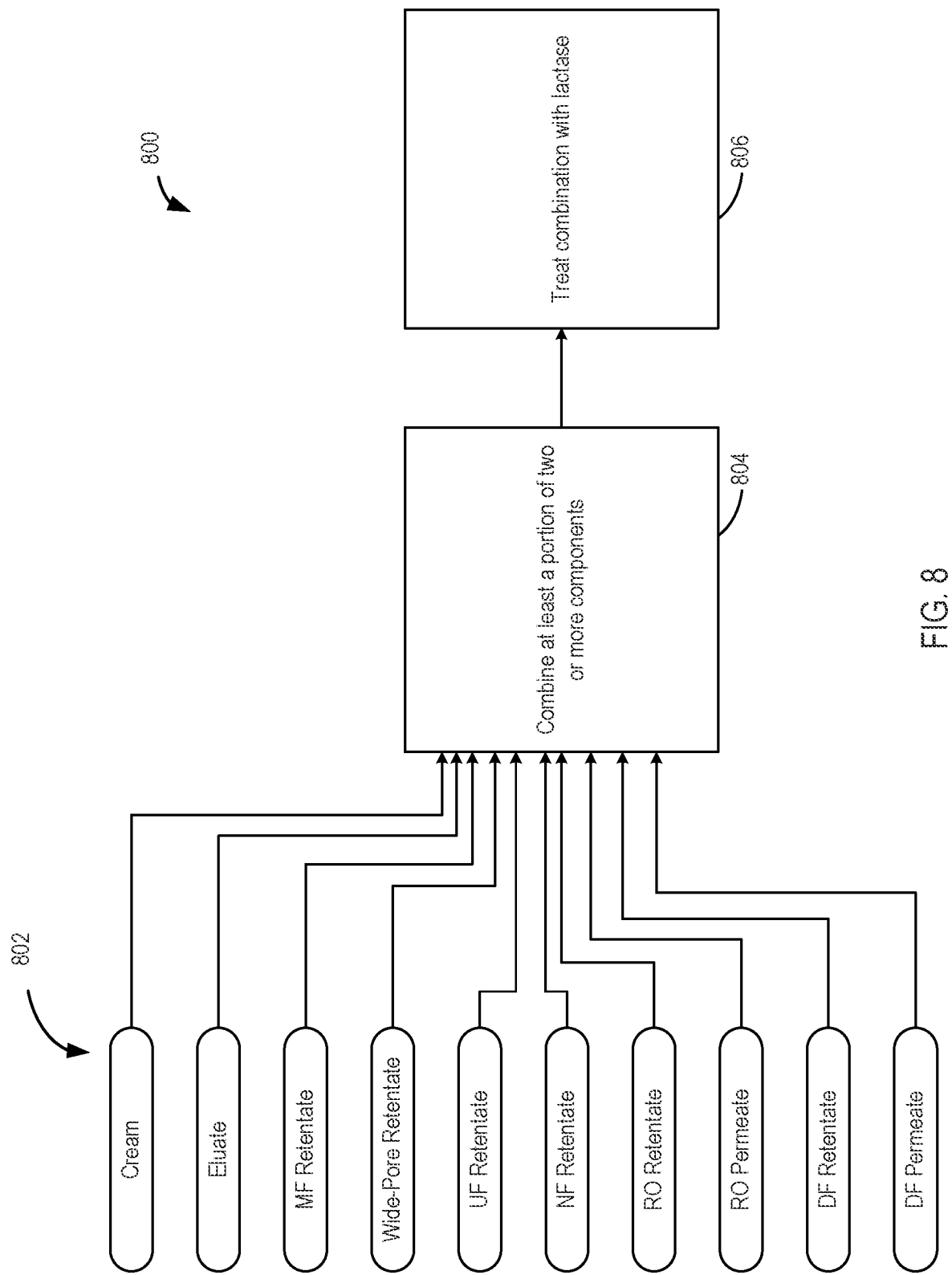
FIG. 8 illustrates a flow chart of a method for producing a milk product from separated milk components, according to one embodiment.

FIG. 8 illustrates a flow chart of a method 800 for producing a milk product from separated milk components 802, according to one embodiment. The milk components 802 may include cream, micro-filtered retentate, micro-filtered permeate, wide-pore retentate, wide-pore permeate, ultra-filtered retentate, ultra-filtered permeate, nano-filtered retentate, nano-filtered permeate, reverse osmosis retentate, reverse osmosis permeate, diafiltered permeate, and diafiltered retentate. The milk components 802 may be derived from the methods described with reference to FIGS. 3-7. Further in some embodiments, the milk components 802 may comprise a sub combination of the illustrated milk components 802.

The method 800 may include combining 804 at least a portion of two or more of the cream, the eluate, the micro-filtered retentate, the wide-pore retentate, the ultra-filtered retentate, the nano-filtered retentate, the nano-filtered permeate, the reverse osmosis retentate, the reverse osmosis permeate, the diafiltered permeate, and the diafiltered retentate to form a mixture. In some embodiments, the mixture may be a milk product with a target level of milk components such as target levels of butterfat, protein, type of protein, lactose, and/or carbohydrate (e.g., Glucose and Galactose). For example, the nano-filtered retentate may be omitted from the mixture to produce a low lactose product. The mixture may be treated 806 with a lactase enzyme. In some embodiments, the method 800 may include combining one or more milk components 802 with sweeteners. In some embodiments, the method 800 may include combining one or more milk components 802 with flavors.

The milk components 802 may be combined to produce a composition. There is a plurality of compositions that may be produced including the following example compositions.

(1) A composition comprising 0-5.0% butterfat, 1.0-6.0% protein, and 0-5.0% lactose. In some embodiments, this may be prepared by combining at least a portion of the cream, wide-pore retentate, the ultra-filtered retentate, the reverse osmosis retentate, and either water or reverse osmosis permeate.

(2) A composition comprising 0-5.0% butterfat, 1.0-6.0% protein, and 0-5.0% lactose. The protein comprising beta-lactoglobulin. The beta-lactoglobulin being 0-6% of the composition. In some embodiments, this may be prepared by combining at least a portion of the cream, wide-pore retentate, the ultra-filtered retentate, the reverse osmosis retentate, and either water or reverse osmosis permeate.

(3) A composition comprising 0-5.0% butterfat, 1.0-6.0% protein, and 0-5.0% lactose The protein comprising alpha-lactalbumin. The alpha-lactalbumin being 0.25-1.5% of the composition. In some embodiments, this may be prepared by combining at least a portion of the cream, wide-pore retentate, the ultra-filtered retentate, the reverse osmosis retentate, and either water or reverse osmosis permeate.

(4) A composition comprising 0-5.0% butterfat, 1.0-6.0% protein, and 0-5.0% lactose. The protein comprising beta-lactoglobulin and alpha-lactalbumin. The beta-lactoglobulin being 1-6% of the composition, and the alpha-lactalbumin being 0.25-1.5% of the composition. In some embodiments, this may be prepared by combining at least a portion of the cream, wide-pore retentate, the ultra-filtered retentate, the reverse osmosis retentate, and either water or reverse osmosis permeate.

(5) A composition comprising 0-5.0% butterfat, 1.0-6.0% protein and 2-6% glucose and galactose combined. In some embodiments, this may be prepared by combining at least a portion of the cream, wide-pore retentate, the ultra-filtered retentate, the reverse osmosis retentate, and either water or reverse osmosis permeate and lactase treating the mixture (6) A low-fat and high-protein composition. In some embodiments, this may be prepared by combining at least a portion of the cream, wide-pore retentate, the ultra-filtered retentate, the reverse osmosis retentate, and either water or reverse osmosis permeate.

(7) A no fat, high protein, high minerals and low lactose composition. In some embodiments, this may be prepared by combining at least a portion of the cream, wide-pore retentate, the ultra-filtered retentate, the reverse osmosis retentate, and either water or reverse osmosis permeate.

(8) A low fat, high protein, low lactose, and high mineral product.

(9) Compositions prepared from one or more milk components selected from the group consisting of include cream, micro-filtered retentate, micro-filtered permeate, wide-pore retentate, wide-pore permeate, ultra-filtered retentate, ultra-filtered permeate, nano-filtered retentate, nano-filtered permeate, reverse osmosis retentate, reverse osmosis permeate, diafiltered permeate, and diafiltered retentate.

Example Embodiments

The following are some example embodiments within the scope of the disclosure. In order to avoid complexity in providing the disclosure, not all of the examples listed below are separately and explicitly disclosed as having been contemplated herein as combinable with all of the others of the examples listed below and other embodiments disclosed hereinabove. Unless one of ordinary skill in the art would understand that these examples listed below (and the above disclosed embodiments) are not combinable, it is contemplated within the scope of the disclosure that such examples and embodiments are combinable.

Example 1. A method for filtering milk, the method comprising: filtering milk with a wide-pore filter to produce a wide-pore retentate and a wide-pore permeate, wherein the wide-pore retentate comprises casein and beta-lactoglobulin; ultra-filtering the wide-pore permeate to produce an ultra-filtered retentate and an ultra-filtered permeate, wherein the ultra-filtered retentate comprises alpha-lactalbumin; nano-filtering the ultra-filtered permeate to produce a nano-filtered retentate and a nano-filtered permeate, wherein the nano-filtered retentate comprises lactose; and performing reverse osmosis (RO) on the nano-filtered permeate to produce a reverse osmosis retentate and a reverse osmosis permeate.

Example 2. The method of example 1, wherein a smallest molecule of the wide-pore retentate is between 25 kDa and 350 kDa.

Example 3. The method of example 1, further comprising separating whole milk into cream and skim milk prior to the filtering with the wide-pore filter, wherein filtering milk with the wide-pore filter comprises filtering skim milk with the wide-pore filter.

Example 4. The method of example 3, further comprising combining at least a portion of each of the cream, the wide-pore retentate, the ultra-filtered retentate, and the reverse osmosis retentate to produce a filtered milk product.

Example 5. The method of example 4, further comprising treating the filtered milk product with a lactase enzyme.

Example 6. The method of example 1, further comprising: separating whole milk into cream and skim milk prior to the filtering with the wide-pore filter; and micro-filtering the skim milk prior to filtering with the wide-pore filter to produce a micro-filtered retentate and a micro-filtered permeate, wherein filtering milk with the wide-pore filter comprises filtering the micro-filtered permeate.

Example 7. The method of example 6, further comprising mixing at least a portion of two or more of the cream, the micro-filtered retentate, the micro-filtered permeate, the wide-pore retentate, the wide-pore permeate, the ultra-filtered retentate, the ultra-filtered permeate, the reverse osmosis retentate, and the reverse osmosis permeate to form a mixture.

Example 8. The method of example 1, further comprising subjecting one or more of the ultra-filtered retentate, the micro-filtered retentate, and the wide-pore retentate to a diafiltration step to produce a diafiltered permeate and a diafiltered retentate.

Example 9. A filtering system for producing a filtered dairy product, the system comprising: a separator to separate whole milk into cream and skim milk; a micro-filter to filter the skim milk to produce a micro-filtered retentate and a micro-filtered permeate, wherein the micro-filtered retentate comprises casein; a wide-pore filter to filter the micro-filtered permeate with a wide-pore filter to produce a wide-pore retentate and a wide-pore permeate, wherein a smallest molecule of the wide-pore retentate is between 25 kDa and 350 kDa; an ultra-filter to filter the wide-pore permeate to produce an ultra-filtered retentate and an ultra-filtered permeate, wherein the ultra-filtered retentate comprises alpha-lactalbumin; a nano-filter to filter the ultra-filtered permeate to produce a nano-filtered retentate and a nano-filtered permeate, wherein the nano-filtered retentate comprises lactose; and a reverse osmosis apparatus to perform reverse osmosis on the nano-filtered permeate to produce a reverse osmosis retentate and a reverse osmosis permeate.

Example 10. The system of example 9, wherein the wide-pore retentate comprises beta-lactoglobulin.

Example 11. The system of example 9, further comprising a mixer to mix at least a portion of two or more of the cream, the micro-filtered retentate, the micro-filtered permeate, the wide-pore retentate, the wide-pore permeate, the ultra-filtered retentate, the ultra-filtered permeate, the reverse osmosis retentate, and the reverse osmosis permeate to form a mixture comprising a filtered milk product.

Example 12. The system of example 11, further comprising an enzymatic treatment apparatus to treat the filtered milk product with a lactase enzyme.

Example 13. The system of example 9, further comprising one or more of a first diafiltrator to perform diafiltration on the ultra-filtered retentate; a second diafiltrator to perform diafiltration on the wide-pore retentate; and a third diafiltrator to perform diafiltration on the micro-filtered retentate.

Example 14. The system of example 9, further comprising a chromatography device to perform ion exchange chromatography on the skim milk to produce an eluate and a modified skim milk, wherein the eluate comprises lactoferrin and lactoperoxidase.

Example 15. A method for alpha-filtering milk, the method comprising: separating whole milk into cream and skim milk; performing ion exchange chromatography on the skim milk to produce an eluate and a modified skim milk, wherein the eluate comprises lactoferrin and lactoperoxidase; ultra-filtering the modified skim milk to produce an ultra-filtered retentate and an ultra-filtered permeate; nano-filtering the ultra-filtered permeate to produce a nano-filtered retentate and a nano-filtered permeate, wherein the nano-filtered retentate comprises lactose; and performing reverse osmosis on the nano-filtered permeate to produce a reverse osmosis retentate and a reverse osmosis permeate.

Example 16. The method of example 15, further comprising: filtering the modified skim milk with a wide-pore filter prior to ultra-filtering to produce a wide-pore retentate and a wide-pore permeate, wherein a smallest molecule of the wide-pore retentate is between 25 kDa and 350 kDa.

Example 17. The method of example 16, further comprising: micro-filtering the modified skim milk prior to filtering the modified skim milk with the wide-pore filter to produce a micro-filtered retentate and a micro-filtered permeate, wherein the micro-filtered retentate comprises casein, and wherein the wide-pore retentate comprises beta-lactoglobulin.

Example 18. The method of example 17, further comprising combining at least a portion of each of the cream, the eluate, the micro-filtered retentate, the wide-pore retentate, the ultra-filtered retentate, and the reverse osmosis retentate to produce a milk product.

Example 19. The method of example 18, further treating the milk product with a lactase enzyme.

Example 20. The method of example 15, further comprising subjecting one or more of the ultra-filtered retentate, the micro-filtered retentate, and the wide-pore retentate to a diafiltration step to produce a diafiltered permeate and a diafiltered retentate.

Example 21. The method of example 15, performing ion exchange chromatography on the skim milk to produce an eluate and a modified skim milk, wherein the eluate comprises lactoferrin and lactoperoxidase.

Example 22. A method to produce a filtered milk product, the method comprising: separating whole milk into cream and skim milk; filtering the skim milk with a wide-pore filter to produce a wide-pore retentate and a wide-pore permeate, wherein the wide-pore retentate comprises casein and beta-lactoglobulin; ultra-filtering the wide-pore permeate to produce an ultra-filtered retentate and an ultra-filtered permeate, wherein the ultra-filtered retentate comprises alpha-lactalbumin; nano-filtering the ultra-filtered permeate to produce a nano-filtered retentate and a nano-filtered permeate, wherein the nano-filtered retentate comprises lactose; performing reverse osmosis (RO) on the nano-filtered permeate to produce a reverse osmosis retentate and a reverse osmosis permeate; and combining at least a portion of each of the cream, the wide-pore retentate, the ultra-filtered retentate, and the reverse osmosis retentate to form a mixture, the mixture comprising a filtered milk product.

Example 23. A system for filtering milk to produce a filtered milk product, the method comprising: a separator to separate whole milk into cream and skim milk; a chromatography device to perform ion exchange chromatography on the skim milk to produce an eluate and a modified skim milk, wherein the eluate comprises lactoferrin and lactoperoxidase; an ultra-filter to filter the modified skim milk to produce an ultra-filtered retentate and an ultra-filtered permeate; a nano-filter to filter the ultra-filtered permeate to produce a nano-filtered retentate and a nano-filtered permeate, wherein the nano-filtered retentate comprises lactose; and a reverse osmosis apparatus to perform reverse osmosis on the nano-filtered permeate to produce a reverse osmosis retentate and a reverse osmosis permeate.

Example 24. A method for producing filtered milk, the method comprising: separating whole milk into cream and skim milk; performing ion exchange chromatography on the skim milk to produce an eluate and a modified skim milk, wherein the eluate comprises lactoferrin and lactoperoxidase; ultra-filtering the modified skim milk to produce an ultra-filtered retentate and an ultra-filtered permeate; nano-filtering the ultra-filtered permeate to produce a nano-filtered retentate and a nano-filtered permeate, wherein the nano-filtered retentate comprises lactose; performing reverse osmosis on the nano-filtered permeate to produce a reverse osmosis retentate and a reverse osmosis permeate; and mixing at least a portion of each of the cream, the eluate, the ultra-filtered retentate, and the reverse osmosis retentate to form a mixture, the mixture comprising a filtered milk product.

Example 25. A dairy processing method comprising: filtering a milk product with a wide-pore filter to produce a wide-pore retentate and a wide-pore permeate, wherein the wide-pore retentate comprises casein and beta-lactoglobulin; ultra-filtering the wide-pore permeate to produce an ultra-filtered retentate and an ultra-filtered permeate, wherein the ultra-filtered retentate comprises alpha-lactalbumin; nano-filtering the ultra-filtered permeate to produce a nano-filtered retentate and a nano-filtered permeate, wherein the nano-filtered retentate comprises lactose; and performing reverse osmosis (RO) on the nano-filtered permeate to produce a reverse osmosis retentate and a reverse osmosis permeate.

Example 26. The method of example 25, further comprising separating whole milk into cream and skim milk prior to the filtering with the wide-pore filter, wherein filtering the milk product with the wide-pore filter comprises filtering skim milk with the wide-pore filter.

Example 27. The method of example 25, further comprising: separating whole milk into cream and skim milk prior to the filtering with the wide-pore filter; and micro-filtering the skim milk prior to filtering with the wide-pore filter to produce a micro-filtered retentate and a micro-filtered permeate, wherein filtering the milk product with the wide-pore filter comprises filtering the micro-filtered permeate.

The described features, operations, or characteristics may be arranged and designed in a wide variety of different configurations or combined in any suitable manner in one or more embodiments. Thus, the detailed description of the embodiments of the systems and methods is not intended to limit the scope of the disclosure, as claimed, but is merely representative of possible embodiments of the disclosure. In addition, it will also be readily understood that the order of the steps or actions of the methods described in connection with the embodiments disclosed may be changed as would be apparent to those skilled in the art. Thus, any order in the drawings or Detailed Description is for illustrative purposes only and is not meant to imply a required order, unless specified to require an order.

In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

The scope of the present invention should, therefore, be determined only by the following claims.

The invention claimed is:

1. A filtering system for producing a filtered dairy product, the system comprising:
    a separator to separate whole milk into cream and skim milk;
    a micro-filter to filter the skim milk to produce a micro-filtered retentate and a micro-filtered permeate, wherein the micro-filtered retentate comprises casein;
    a wide-pore filter to filter the micro-filtered permeate with a wide-pore filter to produce a wide-pore retentate and a wide-pore permeate, wherein the wide-pore retentate comprises beta-lactoglobulin, and wherein a smallest molecule of the wide-pore retentate is between 25 kDa and 350 kDa;
    an ultra-filter to filter the wide-pore permeate to produce an ultra-filtered retentate and an ultra-filtered permeate, wherein the ultra-filtered retentate comprises alpha-lactalbumin;
    a nano-filter to filter the ultra-filtered permeate to produce a nano-filtered retentate and a nano-filtered permeate, wherein the nano-filtered retentate comprises lactose; and
    a reverse osmosis apparatus to perform reverse osmosis on the nano-filtered permeate to produce a reverse osmosis retentate and a reverse osmosis permeate.

2. The system of claim 1, further comprising a mixer to mix at least a portion of two or more of the cream, the micro-filtered retentate, the wide-pore retentate, the ultra-filtered retentate, the reverse osmosis retentate, and the reverse osmosis permeate to form a mixture comprising a filtered milk product.

3. The system of claim 2, further comprising an enzymatic treatment apparatus to treat the filtered milk product with a lactase enzyme.

4. The system of claim 1, further comprising one or more diafiltrators to perform diafiltration on one or more of the ultra-filtered retentate and the wide-pore retentate.

5. The system of claim 1, further comprising a chromatography device to perform ion exchange chromatography on the skim milk to produce an eluate and a modified skim milk, wherein the eluate comprises lactoferrin and lactoperoxidase.

6. A filtering system for producing a filtered milk product, the system comprising:
    a wide-pore filter to filter milk to produce a wide-pore retentate and a wide-pore permeate, wherein the wide-pore retentate comprises beta-lactoglobulin;
    an ultra-filter to filter the wide-pore permeate to produce an ultra-filtered retentate and an ultra-filtered permeate;
    a nano-filter to filter the ultra-filtered permeate to produce a nano-filtered retentate and a nano-filtered permeate; and
    a reverse osmosis apparatus to perform reverse osmosis on the nano-filtered permeate to produce a reverse osmosis retentate and a reverse osmosis permeate.

7. The system of claim 6, further comprising a mixer to mix at least a portion of two or more of a cream, a micro-filtered retentate, the wide-pore retentate, the ultra-filtered retentate, the reverse osmosis retentate, and the reverse osmosis permeate to form a mixture comprising the filtered milk product.

8. The system of claim 6, further comprising an enzymatic treatment apparatus to treat the filtered milk product with a lactase enzyme.

9. The system of claim 6, further comprising one or more diafiltrators to perform diafiltration on one or more of the ultra-filtered retentate and the wide-pore retentate.

10. The system of claim 6, further comprising a chromatography device to perform ion exchange chromatography on the skim milk to produce an eluate and a modified skim milk, wherein the eluate comprises lactoferrin and lactoperoxidase.

11. The system of claim 6, further comprising a separator to separate whole milk into cream and skim milk.

12. The system of claim 6, further comprising a micro-filter to filter skim milk to produce a micro-filtered retentate and a micro-filtered permeate, wherein the micro-filtered retentate comprises casein.

13. The system of claim 6, wherein a smallest molecule of the wide-pore retentate is between 25 kDa and 350 kDa.

14. The system of claim 6, wherein the ultra-filtered retentate comprises alpha-lactalbumin.

15. The system of claim 6, wherein the nano-filtered retentate comprises lactose.

16. A filtering system for producing a filtered milk product, the system comprising:

a wide-pore filter to filter milk to produce a wide-pore retentate and a wide-pore permeate, wherein the wide-pore retentate comprises beta-lactoglobulin;

an ultra-filter to filter the wide-pore permeate to produce an ultra-filtered retentate and an ultra-filtered permeate, wherein the ultra-filtered retentate comprises alpha-lactalbumin;

a nano-filter to filter the ultra-filtered permeate to produce a nano-filtered retentate and a nano-filtered permeate, wherein the nano-filtered retentate comprises lactose; and a reverse osmosis apparatus to perform reverse osmosis on the nano-filtered permeate to produce a reverse osmosis retentate and a reverse osmosis permeate; and a mixing apparatus to combine at least a portion of two or more of the wide-pore retentate, the ultra-filtered retentate, the reverse osmosis retentate, and the reverse osmosis permeate to produce the filtered milk product.

17. The system of claim 16, further comprising an enzymatic treatment apparatus to treat the filtered milk product with a lactase enzyme.

18. The system of claim 16, further comprising one or more diafiltrators to perform diafiltration on one or more of the ultra-filtered retentate and the wide-pore retentate.

19. The system of claim 16, further comprising a chromatography device to perform ion exchange chromatography on the skim milk to produce an eluate and a modified skim milk, wherein the eluate comprises lactoferrin and lactoperoxidase.

* * * * *